United States Patent [19]

Heuckroth

[11] 4,426,046

[45] Jan. 17, 1984

[54] WIRE DRIVE SYSTEM

[76] Inventor: Carl C. Heuckroth, 101 Hemlock Dr., Lodi, Ohio 44254

[21] Appl. No.: 307,902

[22] Filed: Oct. 2, 1981

[51] Int. Cl.³ ..................... B65H 51/10; B65H 57/00
[52] U.S. Cl. .................................. 242/181; 226/168; 226/177; 226/196; 226/199
[58] Field of Search .............. 226/180, 174, 176, 177, 226/181, 186, 187, 196, 199, 168; 414/432, 431

[56] References Cited

U.S. PATENT DOCUMENTS 4,333,594 6/1982 Cloos .................................. 226/181

*Primary Examiner*—Stanley N. Gilreath
*Attorney, Agent, or Firm*—Reising, Ethington, Barnard, Perry & Milton

[57] ABSTRACT

A wire drive system of the type utilizing a plurality of rollers having mutually inclined axes and adapted to planetate about a wire whereby said rollers impart a linear motion to the wire, the improvement being to impart a roller-induced vibration to the wire and to support the vibrating wire in such a way as to perpetuate such vibration as the wire is driven through a conduit system to a point of use such as a welding gun.

6 Claims, 9 Drawing Figures

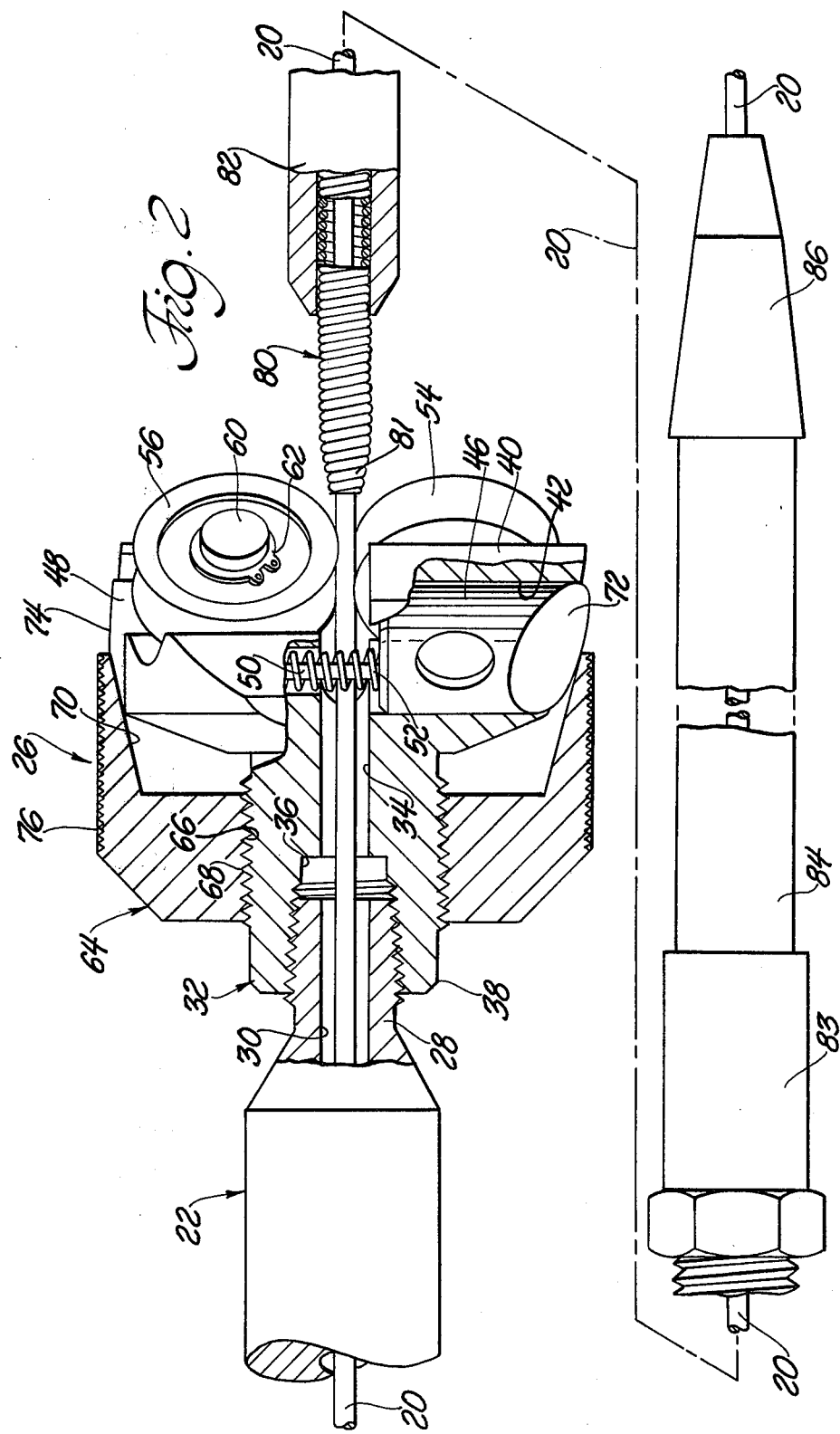

U.S. Patent   Jan. 17, 1984   Sheet 3 of 3   4,426,046

WIRE DRIVE SYSTEM

TECHNICAL FIELD

The subject matter of the present invention is a wire drive system and, more specifically, a system adapted to feed welding wire from a welding wire source to a welding gun. In particular, the subject welding wire feed system is of a type where the wire drive mechanism is located remotely from the welding wire gun such that the welding wire is pushed through a flexible cable connected between the drive mechanism and the welding wire gun.

In general, it is desirable to locate the welding wire drive mechanism remote from the welding wire gun to reduce the bulkiness of the welding system with which the operator has to cope. In other words, by remotely locating the welding wire drive mechanism from the welding gun itself, the weight of the mechanism to be manipulated by the welding gun operator is greatly reduced as is the mechanical clutter around the welding station. The factor limiting the distance that the welding wire drive mechanism can be located from the welding gun is normally determined by the ability of the wire to resist collapsing as it is driven through the system. Such collapsing is often referred to as bird-nesting and occurs when the columnar strength of the wire is exceeded. In the type of drive system with which applicant is concerned, the wire is laterally unsupported as as it leaves the wire drive mechanism and before it enters a transmitting conduit leading, for example, to a welding wire gun. It is normally in such unsupported area where such wire collapse or bird-nesting occurs and happens when the wire drag or resistance to movement through the conduit combines with the wire driving force to overcome the columnar strength of the wire. Once such collapse occurs the wire will cease movement through the conduit and will simply pile up in the area of collapse until the drive mechanism is shut off.

Applicant has developed the wire drive system which substantially reduces the tendency of wire to collapse or bird-nest as it passes from a wire drive mechanism to a wire transmitting conduit and, therefore, also increases the distance over which said wire may be push-driven. Applicant achieves his greatly improved wire drive system by reducing the frictional drag as the wire is pushed through a conduit, reducing the unsupported wire distance between the wire driving mechanism and the wire transmitting conduit, and reducing the criticality of axial alignment between the wire as it leaves the wire driving mechanism and the wire receiving conduit.

It is also known that in attempting to push wire, and particularly welding wire, through a conduit where the welding wire conduit is subjected to many turns, internal drag between the wire and conduit can cause the wire to issue from the end of such conduit at an uneven or disrupted rate. In other words, it is found that the resistance to movement of the wire through such conduit is such that the wire sticks until the wire driving pressure builds sufficiently to overcome such resistance allowing the movement of the wire to continue. In the case of leading such wire to a welding gun, such interrupted wire flow can disrupt the formation of a weld joint and thereby deteriorate the quality of such weld.

Applicant has discovered that by inducing a vibration into the wire as it exits from the wire driving means and providing a wire conduit transmission system in which such vibration can persist as the wire is pushed therethrough, the distance over which such wire may be pushed is increased and the rate or smoothness of flow of such wire is made more constant. An important feature of applicant's invention resides in providing a transitional, flexible conduit section which includes an unsupported end adapted to receive the wire immediately as its exits from the wire drive mechanism and to be laterally deflectable with said wire.

In summary, applicant has developed a drive mechanism which induces and maintains a vibratory motion in a wire which thereby increases the distance that such mechanism may be located from a workpiece, such as a welding wire gun, greatly steadies the rate of which wire flow through a conduit, and reduces the possibility of wire collapse or bird-nesting as the wire is pushed through the system.

BACKGROUND ART

Since it adds to portability and reduces the overall bulk of the wire transmission system, applicant has created a compact and lightweight wire drive mechanism. In the past, one of the most common welding wire drive systems has involved the use of aligned rollers in which the roller surfaces are knurled or roughened and coact to drive against the wire. Such knurled driving rolls roughen the surface of the welding wire thereby increasing the sliding resistance between such wire and its surrounding conduit, increasing the necessary wire driving force and also wearing the various conduit surfaces and welding gun tips with which such wire comes into contact. To avoid such knurled wire driving rolls, applicant utilizes a pair of planetary driving rolls incorporated in a rotating drive head for imparting linear or linear-like motion to the welding wire. As shown in the following patents, welding wire drive systems utilizing planetary type rollers are known to be old prior to applicant's invention:

U.S. Pat. No. 3,014,519—Wright,
U.S. Pat. No. 3,684,152—Boden,
U.S. Pat. No. 3,738,555—Karnes et al.,
U.S. Pat. No. 4,049,172—Samokovliski et al.,
U.S. Pat. No. 4,098,445—Samokovliski et al.

In common, such planetary drive heads include a plurality of rollers having axes of rotation skewed to each other and laterally offset from the axis or line of movement of the wire being driven. When the roller axes planetate about the wire, the roller peripheries engage the wire and create a threading-type action causing the wire to move generally linearly as the head rotates. The direction of wire movement can be reversed by reversing the rotative direction of the head.

Most of the prior art planetary roller drive mechanisms, while avoiding the use of knurled driving rollers, have been primarily concerned with the means for adjusting the position of the rollers to accommodate different size wires and for compensating for centrifugal forcing tending to move the rollers out of driving engagement with the wire. Applicant is also able to accommodate various size wires through the use of means for manually adjusting the radial position of such rollers relative to the wire to be driven. However, applicant's departure from the prior art wire drive mechanisms is in the recognition of the desirability of inducing a vibration into the wire being driven and providing a wire support system which allows such vibration to be perpetuated through the system and up to the point of use of such wire as at a welding gun tip. Particularly as applied to feeding welding wire, vibrating such wire has several advantages. First, by introducing a vibration to the wire tip at the welding gun a stirring of the weld puddle is achieved which helps eliminate undesirably included materials, such as oxides, from the weld joint thereby improving the weld quality. Next, the wire vibration reduces the frictional drag or resistance between the wire and the conduit through which it is being driven. By reducing wire/conduit friction, the tendency of the wire to collapse or bird-nest under wire driving forces is reduced thereby increasing the distance the wire drive mechanism may be located from a workpiece or increasing the distance over which said wire may be driven.

DISCLOSURE OF THE INVENTION

Applicant has developed a compact, lightweight wire drive mechanism wherein rotary or planetary movement of rollers about the wire to be driven is converted to a linear or linearlike movement of the wire. More specifically, the planetary drive mechanism induces a vibration into the wire and the wire is thereafter supported in a manner that such vibration persists as the wire is pushed through a conduit system to its point of use such as at a welding gun.

Broadly, the system includes a support member to which an electric motor is mounted and which support member includes a bracket formed at one end thereof having an axial passage formed therethrough. The electric motor has a hollow drive shaft axially aligned with the bracket opening and through which shaft wire is adapted to be fed. A wire drive head is mounted for rotation with the motor shaft and includes a central wire passage coincident with the axis of rotation of the hollow motor shaft. The wire drive head includes a pair of wheel or roller members disposed on laterally opposite sides of the wire and means for urging said rollers radially into engagement with said wire to make driving contact therewith. Said motor is adapted to drive the roller wheels in a planetary fashion about said wire in such a way that the respective angles of rotation of each roller member causes the roller to impart a screwing-type contact with the wire to impart a generally linear movement thereto the speed of which is proportional to the rotary speed of the electric motor. The peripheral contact between the rollers and wire is such that the wire is laterally offset from the axis of rotation of said motor shaft and wire driving head and which offset relationship imparts a vibration to the wire as it exits the rollers. For reasons already noted, the vibration of such wire is desired and the system includes further means for assuring that such vibration is maintained as the wire is transmitted to its ultimate source of use. To this end, a flexible conduit section is supported at one end within the support member bracket opening so that the free end of the flexible conduit section is disposed proximate the wire driving rollers and receives the wire immediately as it issues from the rollers. Since the wire is laterally radially offset from the axis of rotation of said head, the free end of the flexible conduit section is also deflected from said axis along with the wire. Thus, the unsupported portion of the flexible wire section is free to vibrate with the wire as the same is transmitted therethrough. The supported end of the flexible conduit section in turn connects with a flexible conduit adapted to deliver the wire to its point of use, e.g. a welding gun. The internal diameters of the flexible conduits are such that the vibration induced in the wire at the driving head is not inhibited as the wire progresses therethrough.

BRIEF DESCRIPTION OF THE DRAWINGS

FIG. 2 is an enlarged sectional view of the wire drive head;

BEST MODE FOR CARRYING OUT THE INVENTION

Figure 1:
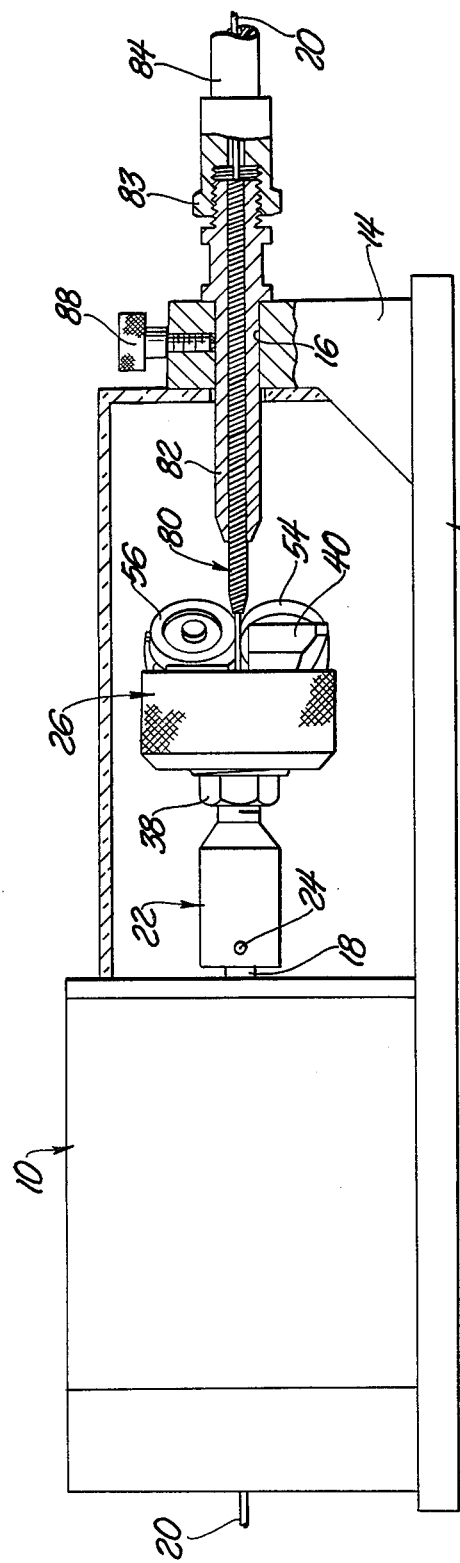
FIG. 1 is a partially sectioned side elevational view of the wire drive system.
Figure 3D:
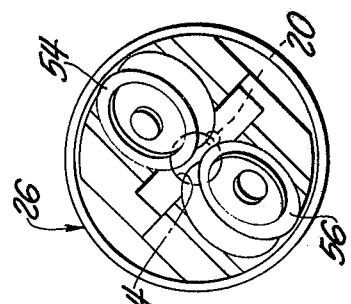
FIGS. 3a through 3d are end views of the wire driving head depicting the laterally offset position of the welding wire relative to the axis of rotation of said head as said wire is driven by the wire driving rollers.
Figure 3C:
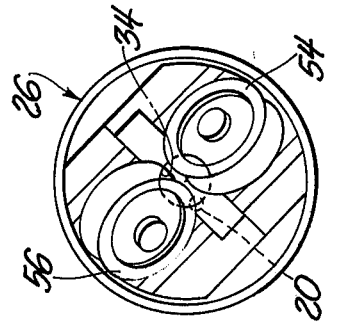
Figure 3B:
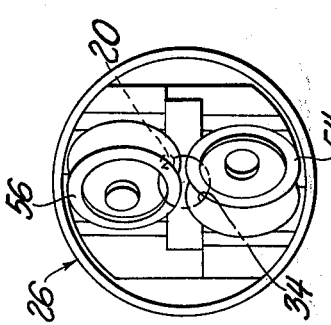
Figure 3A:
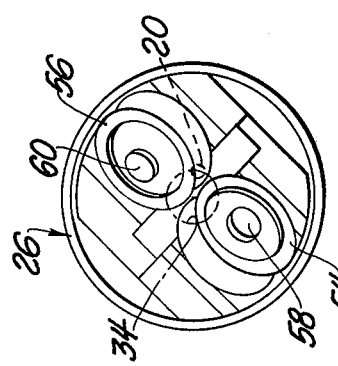

Since the subject invention has particular applicability to the system for feeding welding wire to a welding wire gun, the invention will be illustrated in such an environment. Referring first to FIG. 1 of the drawings, a variable speed electric motor is indicated generally at 10 and is adapted to be suitably mounted upon a support member 12. Depending on the particular application involved, the support member 12 may be mounted horizontally or hung from a suitable overhead structure normally vertically over the head of the welding gun operator. Support member 12 includes a bracket structure 14 formed at one end thereof and having an axial passage 16.

Motor 10 includes a hollow output shaft 18 through which a wire member 20 is adapted to be fed. A hollow stub shaft 22 is fixed to motor output shaft 18 through a suitable screw member 24.

A wire drive head is indicated generally at 26 and is mounted for rotation with stub shaft 22 and motor output shaft 18. More specifically, stub shaft 22 includes a reduced diameter portion 28 having an exterior thread formed thereon and a wire receiving passage 30. The wire driving head 26 includes a body member 32 having a wire receiving bore 34 formed axially therethrough and including an enlarged counter bore 36 at the rear or motor-facing end thereof. Counter bore 36 is internally threaded whereby said body member 32 may be mounted upon the threaded portion 28 of stub shaft 22. The wire receiving passages 34 and 30 are coaxial with the axis of rotation of the hollow motor shaft 18. The exterior portion 38 of body 32 is formed as a nut to allow the body to be held against rotation to adjust the driving head to different size wires as will be described in detail below.

Figure 4:
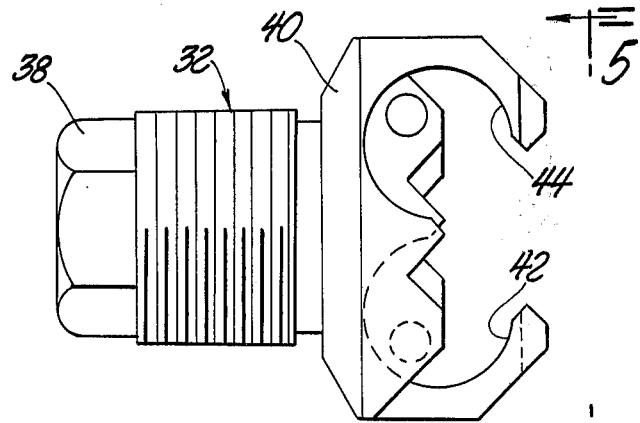
FIG. 4 is a plan view of the roller supporting body.
Figure 5:
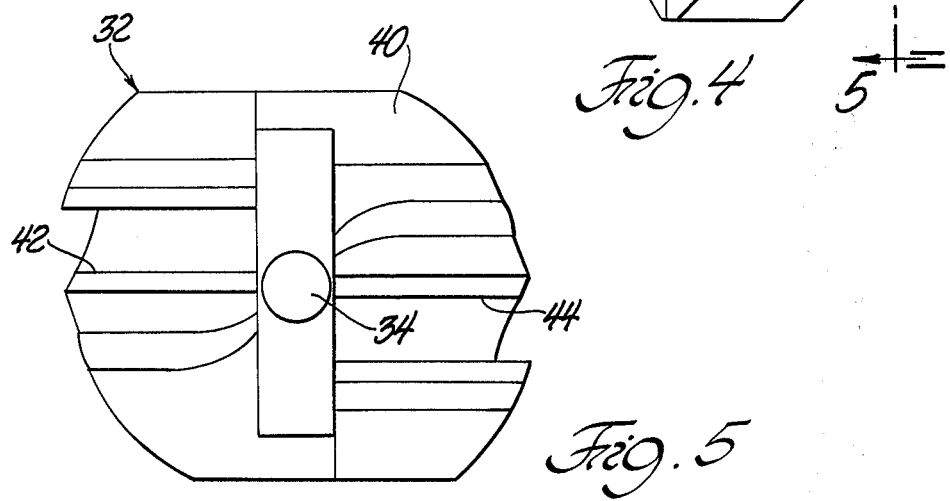
FIG. 5 is an end view of the roller supporting body.

As best seen by reference to FIGS. 2, 4 and 5, body 32 includes an enlarged portion 40 having cylindrical openings 42 and 44 formed therethrough and which openings are disposed on opposite sides of wire receiving passage 34. As seen in FIG. 5, cylindrical openings 42 and 44 are laterally offset from passage 34. Piston members 46 and 48 are respectively slidably disposed in cylindrical openings 42 and 44 so as to be radially adjustable therein. Each piston member includes a pin 50 fixed thereto and adapted to have a spring 52 mounted thereabout. One end of spring 52 is supported against a portion of body 32 while the other end biases against the inner portion of each piston tending to bias the latter outwardly away from wire passage 34.

Wire driving rollers 54 and 56 are adapted to be respectively rotatably supported upon pistons 46 and 48. More specifically, roller supporting shafts 58 and 60 are fixed to and extend at right angles from the respective pistons 46 and 48. Rollers 54 and 56 are, in turn, rotatably mounted on said shafts 58 and 60 and retained thereto by the suitable means such as a spring C-clip 62. By referring particularly to FIGS. 2, 3 and 6, it will be noted that roller supporting shafts 58 and 60 are laterally offset from the axis of rotation of head 26 such that each shaft axis would be in a plane parallel to but laterally offset from the axis of rotation of said head and said motor. Additionally, it is to be noted that the roller shaft axes are skewed or angled with respect to each other. As more specifically seen in FIG. 6, the roller shafts 58 and 60 are disposed at 90° to each other. As also noted, particularly in FIGS. 2, 3 and 6, the outer periphery of each roller is concave so as to define axially spaced edges which are adapted to provide two generally line contacts with the wire 20.

As already noted, roller supporting pistons 46 and 48 are biased outwardly by springs 52. Such outward bias obviously tends to move the rollers out of contact with the wire. Wire driving head 26 includes an outer dish-shaped member 64 having an internally threaded bore 66 adapted to threadably engage with an external, threaded portion 68 of body 32. Member 64 includes an internally inclined or conical surface 70 adapted to engage the outer inclined surfaces 72 and 74 of roller mounting pistons 46 and 48. Member 64 includes a knurled outer surface 76 for ease of gripping. By holding nut portion 38, body 32 may be held against rotation permitting member 64 to be rotated and axially moved therealong. Thus, by threadably adjusting outer member 64 relative to body member 32 the pistons 46 and 48 and, therefore, rollers 54 and 56, may be inwardly or outwardly adjusted relative to wire 20. For example, in order to feed wire through the wire drive system, outer member 64 may be threaded in a direction to move the member leftwardly or toward motor 10 as viewed in FIGS. 1 and 2. Such leftward movement of member 64 moves the conical surface 70 away from the outer ends of the pistons thereby permitting springs 52 to bias the pistons and rollers outwardly whereby the wire may be easily fed through the wire driving head 26. Once the wire is so fed, member 64 is now threaded rightwardly or away from motor 10 to cause the conical surface 70 to cam pistons 46 and 48 inwardly until the rollers make driving contact with wire 20. In this way wire driving head 26 may be adjusted to accommodate different sized wires.

With the axially spaced edges of the outer periphery of each roller 54 and 56 in driving contact with wire 20, motor 10 may be energized to rotate head 26 causing the rollers to planetate about said axis of rotation and, in so doing, impart a screwing or threading action against the wire causing a forward or rightward movement thereto as viewed in FIGS. 1 and 2.

Figure 6:
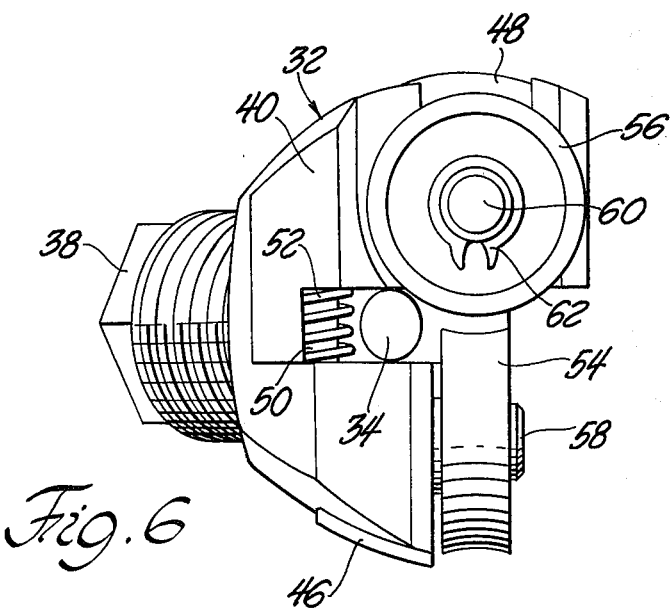
FIG. 6 is an elevational view of the roller supporting body and rollers.

As best visualized in FIGS. 3 and 6, the concave peripheral surfaces of rollers 54 and 56 are disposed at approximately 90° to each other and tend to nest within each other as the rollers are moved toward each other. Further, each roller is disposed at an approximate 45° angle to the wire 20. As head 26 is rotated, the wire driving rollers 54 and 56 engage with and deflect wire 20 laterally causing the same to be offset from the axis of rotation of said head.

FIGS. 3a through 3d depict the lateral offset of wire 20 as the head and rollers rotate through various positions. In any case, the lateral offset relationship of wire 20 with respect to the axis of rotation as said wire passes between rollers 54 and 56 induces a whipping action or vibration into the wire as it exits from the rollers. While such vibration has desirable aspects such as reducing the resistance to flow of such wire through welding head conduit 84 and also producing a vibratory action into the welding puddle, unless properly handled such vibration can create certain difficulties. The major difficulty in pushing wire through the conduit system is the tendency of such wire to so-called bird-nest or collapse when the resistance to wire movement is such that the driving force on the wire overcomes the columnar strength of the wire causing the same to collapse in the area where it is unsupported as it issues from the driving rolls and before it enters a supporting conduit. The whipping or vibratory motion of wire 20, as just described, increases the tendency of such wire to collapse since it is moved off of straight line position which further reduces the columnar strength of the wire. The means for transmitting such wire in a manner to allow it to continue to vibrate and at the same time to support the wire against columnar collapse will now be described.

Referring particularly to FIGS. 1 and 2, a flexible conduit section formed, for example, by a closely coiled wire and sometimes referred to as a Bowden wire is indicated at 80. Flexible conduit section 80 is adapted to be supported at one end within support member bracket opening 16 so that the fixed or supported end thereof is coaxially aligned with the axis of rotation of motor 10 and wire driving head 26. While flexible conduit 80 may be directly mounted within bracket opening 16, it is preferred to first mount a portion of the flexible conduit in a rigid sleeve 82 which is then adjustably supported in the bracket opening. A suitable threaded fitting 83 connects the rigid sleeve 82 with flexible conduit 84 the other end of which connects to welding gun 86. Thus, flexible conduit section 80 is supported as a cantilever from support bracket 14. The free or unsupported end 81 of conduit section 80 is adapted to be disposed adjacent rollers 54 and 56 to receive and support wire 20 as close to the point of its exiting from said rollers as is practical. As has already been noted, and again referring to the views shown in FIGS. 3a through 3d, since wire 20 is laterally offset relative to the axis of rotation of head 26 as it exits from the rollers, the free end of flexible conduit 80 will also be deflected and thereby caused to vibrate with the wire. At this point it should be noted that the internal diameter of flexible conduit 80 as well as that of driving wire feeding conduit 84 is sufficiently larger than the wire diameter that the wire driving head-induced vibration of wire 20 is not restricted by such conduits whereby the wire continues substantial vibration from the point of leaving the head 26 until it exits at welding gun 86.

The columnar strength of wire 20 varies with the wire material and its diameter. For example, steel wire has a higher columnar strength than aluminum wire; thus, the need to support the latter is greater than the former. Likewise, larger diameter wire has higher columnar strength than smaller diameter wire of the same material. Accordingly, means is provided for axially adjusting the position of the flexible conduit section 80 to vary the unsupported distance of wire 20 from head 26 to the conduit. To this end, rigid sleeve 82 is adapted to be slidable or axially adjustable within support bracket opening 16. A suitable threaded locking screw 88 is disposed within a correspondingly threaded opening in bracket 14. By loosening locking screw 88, sleeve 82 may be adjusted axially moving the free or unsupported end of conduit section 80 toward or away from rollers 54 and 56. Thus, the smaller the diameter of wire 20 or the softer the wire material, the closer the free end 81 of flexible conduit section 80 should be to the point of exit of the wire from the rollers 54 and 56. In order to reduce possible interference between the free end 81 of conduit 80 and rollers 54 and 56, such end is sharply tapered thereby increasing the closeness said end may achieve to the rollers.

Other modifications of the wire drive system may be made within the scope of the invention set forth in the hereinafter appended claims.

The embodiments of the invention in which an exclusive property or privilege is claimed are defined as follows:

1. A wire drive mechanism of the type including a rotatable head having an axis of rotation, a wire receiving passage extending through said head and having an axis coincident with said axis of rotation, wire engaging rollers rotatably mounted on said head and having rotative axes radially offset on generally opposite sides of said passage axis, each roller having a concave and continuous outer wire engaging surface, means urging said concave roller surfaces into engagement with a wire, the rotative axes of said rollers being inclined to each other causing said concave surfaces to be disposed at an angle to each other whereby as said rollers rotate with said head about the passage axis a longitudinal motion is imparted to a wire commonly engaged by said roller surfaces, the improvement comprising:
    a. the concave surfaces of said rollers coacting to peripherally engage and laterally offset said wire from the axis of rotation of said head whereby the wire is eccentric to said axis as it exits from said rollers, such eccentricity and longitudinal motion imparting a vibratory motion to said wire;
    b. a flexible conduit; and
    c. means for supporting one end of said conduit in axial alignment with the axis of rotation of said head, the other end of said flexible conduit being free and terminating adjacent said head and receiving said wire, the free end of said flexible conduit being laterally offset from said axis by and adapted to vibrate with said wire.

2. A wire driving mechanism as set forth in claim 1 wherein said flexible conduit supporting means includes a device for adjusting the axial position of said conduit to vary the axial distance between the free end of said conduit and the rollers.

3. A wire drive mechanism of the type including a rotatable head having an axis of rotation, a wire receiving passage extending through said head and having an axis coincident with said axis of rotation, wire engaging rollers rotatably mounted on said head and having rotative axes radially offset on generally opposite sides of said passage axis, each roller having a concave and continuous outer wire engaging surface, means urging said concave roller surfaces into engagement with a wire, the rotative axis of said rollers being inclined to each other causing said concave surfaces to be disposed at an angle to each other whereby as said rollers rotate with said head about the passage axis a longitudinal motion is imparted to a wire commonly engaged by said roller surfaces, the improvement comprising:
    a. the concave surfaces of said rollers coacting to peripherally engage and laterally offset said wire from the axis of rotation of said head whereby the wire is eccentric to said axis as it exits from said rollers, such eccentricity and longitudinal motion imparting a vibratory motion to said wire;
    b. a bracket;
    c. a flexible conduit; and
    d. means for supporting one end of said conduit in said bracket and in axial alignment with the axis of rotation of said head, the other end of said flexible conduit being free and terminating adjacent said head and receiving said wire, the free end of said flexible conduit being laterally offset from said axis by and adapted to vibrate with said wire.

4. A wire drive mechanism as set forth in claim 3 wherein the flexible conduit supporting means includes a rigid tubular member supported at one end from said bracket in coaxial alignment with the axis of rotation of said head, the unsupported end of said tubular member extending toward said head, the one end of the flexible conduit being supported within the tubular member such that the free end may radially flex relative to the tubular member.

5. A wire drive mechanism as set forth in claim 4 wherein said tubular member is slidably supported within said bracket to vary the distance of the free end of the flexible conduit to the head rollers, and said bracket including means to adjustably fix the position of the tubular member within the bracket.

6. A wire drive mechanism of the type including a rotatable head having an axis of rotation, a wire receiving passage extending through said head and having an axis coincident with said axis of rotation, wire engaging rollers rotatably mounted on said head and having rotative axes radially offset on generally opposite sides of said passage axis, each roller having a concave and continuous outer wire engaging surface, means urging said concave roller surfaces into engagement with a wire, the rotative axes of said rollers being inclined to each other causing said concave surfaces to be disposed at an angle to each other whereby as said rollers rotate with said head about the passage axis a longitudinal motion is imparted to a wire commonly engaged by said roller surfaces, the improvement comprising:
    a. the concave surfaces of said rollers coacting to peripherally engage and laterally offset said wire from the axis of rotation of said head whereby the wire is eccentric to said axis as it exits from said rollers, such eccentricity and longitudinal motion imparting a vibratory motion to said wire;
    b. a flexible conduit;
    c. means for supporting one end of said conduit in axial alignment with the axis of rotation of said head, the other end of said flexible conduit being free and terminating adjacent said head and receiving said wire, the free end of said flexible conduit being laterally offset from said axis by and adapted to vibrate with said wire; and
    d. the internal diameter of said flexible conduit being sufficiently larger than the diameter of said wire to allow said wire to continue to vibrate as it moves through said conduit.

* * * * *